United States Patent [19]

Fuchs

[11] 4,025,124
[45] May 24, 1977

[54] REGULATABLE PUMP DEVICE

[76] Inventor: Werner Karl Heinz Fuchs, Sedlmayrstrasse 14, 8 Munich 19, Germany

[22] Filed: July 1, 1974

[21] Appl. No.: 484,603

[30] Foreign Application Priority Data

July 6, 1973 Germany .......................... 2334493

[52] U.S. Cl. .................................. 303/10; 303/116; 303/119; 417/386; 417/399
[51] Int. Cl.² .................. B60T 8/087; B60T 13/16
[58] Field of Search ......... 303/21 F, 10, 11, 61–63, 303/68–69, 21 CG, 113–119, 99, 100, 102; 188/181 A; 417/398–402, 386, 385

[56] References Cited

UNITED STATES PATENTS

| 2,936,712 | 5/1960 | Gerpen | 417/386 |
|---|---|---|---|
| 3,032,995 | 5/1962 | Knowles | 303/10 X |
| 3,288,538 | 11/1966 | Marcellus | 303/21 F X |
| 3,519,311 | 7/1970 | Holden | 303/10 |
| 3,521,934 | 7/1970 | Leiber | 303/21 F |
| 3,524,684 | 8/1970 | Skoyles | 303/21 F |
| 3,645,584 | 2/1972 | Leiber et al. | 303/21 F |
| 3,695,785 | 10/1972 | Vanderlaan | 417/400 |

Primary Examiner—Trygve M. Blix
Assistant Examiner—Douglas C. Butler

[57] ABSTRACT

A piston pump with a controllable stroke is described. It is a positive displacement type pump with several stages and also a continuous variable stroke. The pump piston is only effectively connected with the drive during the working stroke. For example, the pump serves particularly for controlling the braking force in an anti-locking system for vehicles. In every pump cycle it can vary the volume in the braking system, and thus the brake force, without letting fluid out of the brake system. It makes possible the amplitude control of brake pressure pulsations and a desirable brake pressure course. In addition, an anti-locking system with a special two-stage pump device is described. Furthermore, a hydraulic circuit of great utility for anti-locking systems is shown.

13 Claims, 9 Drawing Figures

REGULATABLE PUMP DEVICE

CROSS-REFERENCES TO RELATED APPLICATIONS

In order to be able to reduce the braking force in the case of danger of wheel locking, it is first necessary to be able to allow brake fluid or braking medium to flow out of the wheel braking cylinders before the braking pressure is increased again (for example by means of a pump). The drop in pressure is, as is known, possible in accordance with two methods: In accordance with the first method the braking force as applied by the driver is directly reduced by a generated counter-force. In the case of the second method the braking force applied is blocked off by means of a valve and for the brake fluid subject to the force a fluid accepting means is opened so as to take up fluid under pressure.

Examples for a pump device of the first type are shown in the copending application Ser. No. 405,412, filed Oct. 11, 1973 and those of the second type are shown in the present application. In the case of an anti-locking system for control of a pump device in accordance with the invention a sensor can be used, which checks the rotational delay of a vehicle wheel and provide signals at the beginning of and during an impermissible exceeding of a limit. A sensor which is particularly suitable for this purpose, because it compares the linear vehicle deceleration with the wheel periphery deceleration is described in the copending U.S. pat. application Ser. No. 412,685, filed Nov. 5, 1973.

SUMMARY OF THE INVENTION

The invention generally shows piston pumps with a regulatable stroke. In this respect the regulation can be in stages or also continuous with a regulation sleeve, a rotatable piston or with a regulating valve. In particular these pumps have been developed in conjunction with an anti-locking system for motor vehicles.

On the occurrence of a danger of wheel locking, anti-locking systems should not cause an excessive decrease in the brake pressure in every case but instead they should be capable of being regulated in oder to make possible short braking distances. For this purpose use is made of a two-stage pump device in accordance with the invention for which a device for checking the anti-locking action is present. This device checks and decides whether a brake pressure drop to the first stage is sufficient or whether a more pronounced drop in the brake pressure is necessary before the pressure is increased again. An improvement is attained in this respect since the stroke of a pump piston — at least during a first stage — can be changed by an adjustable regulation sleeve continuously. In particular in this respect the regulation is carried out in accordance with the brake actuating force applied by the driver in order to bring about a better adaptation of the generated brake pressure pulsations to the prevailing road surface conditions. The stroke regulation is carried out by regulation of the liquid quantity, which can be displayed by a pump piston out of a control chamber. Instead of a regulation sleeve, which is shown in various different constructions, it is also possible to make use of an adjustable piston which can be turned and has oblique edge control. In the case of a further embodiment of a pump device, use is made of a pressure regulating valve. Furthermore, an advantageous hydraulic circuit is shown, which makes possible a steeper decrease in the brake pressure and contributes to increasing safety.

In general it should be considered that experienced drivers can reduce the braking distances of vehicles by intermittent or interrupted braking when braking is carried out to avoid a danger, so that the danger of skidding is reduced and in this respect the vehicle is not allowed to get out of control, that is to say it can still be steered. In this respect it is important that the pulsation sequence is not only limited to the necessary section of the path of travel but that also the amplitude of the pulsation is suitably adapted to the road conditions in order not to decrease the breaking pressure excessively and accordingly to increase the braking distance. With the proposed anti-locking system these requirements can be automatically fulfilled in a manner which is considerably better than manual operation.

Figure 7:
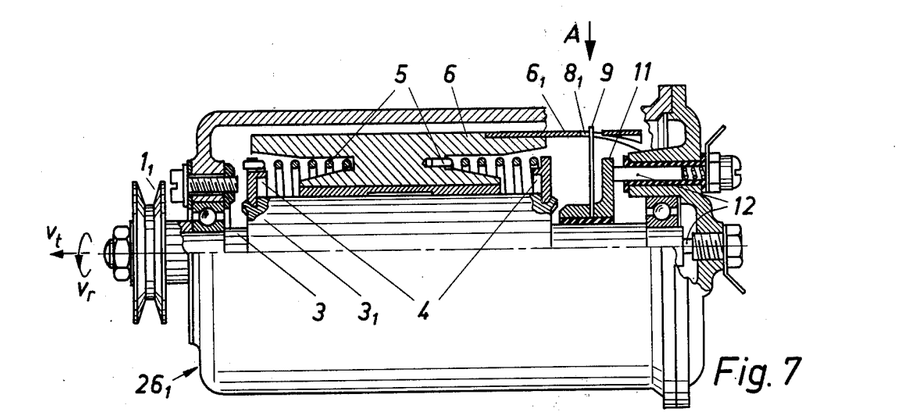
FIG. 7 shows a sensor for deceleration comparison measurements.

In order to fulfill the first requirement after a pulsation sequence restricted to the necessary section of road use is made in this case of a sensor for example, as is shown by FIG. 7. Instead of such a sensor it is naturally also possible to use other sensors suitable for this purpose. For fulfilling the second requirement which demands optimum dimensioning of the pulsations, use is made of a particularly convenient pump device shown in the present application. The device meters out, for example, the liquid quantity, which on the occurrence of a drop in the brake pressure can escape from the wheel brake cylinders or from the brake duct system in accordance with the brake actuating force as set by the driver. This makes possible a more favorable adaptation of the amplitude of the pulsation to the actual road and braking conditions. This regulation is convenient if, for example, as is the case here, only one sensor is used per axle or per vehicle and if all or several wheels are included in the regulation. In this case it is not sufficient to regulate the braking force of only one wheel, as is conventional in the case of single wheel regulation, and to leave out of consideration the coefficient of friction or force transmitting differences at the other wheels. On the other hand, an excessive drop in the brake pressure in the case of pulsation should be avoided as far as possible in order to achieve short braking distances.

The present invention shows an anti-locking system, which comprises a regulatable piston pump as mentioned above and which can favorably fulfill the requirements arising in the case of such a system.

The advantages of the proposed pump device reside more particularly in that the substantial and different requirements can be fulfilled in a surprisingly simple and reliable manner. An important contribution is made in this respect by the pump which can be very easily regulated, with which in the case of danger of wheel locking the (release) volume for the brake liquid is automatically metered in order to e able to change in an optimum manner the amplitude of the braking pressure on pulsation. Furthermore, a steep brake pressure drop which is aimed at in this case and is very advantageous can be obtained. As a result the danger of locking can be rapidly overcome and a sensor can rapidly check, for example, after a pressure drop to a first stage, and define whether possibly a further decrease in pressure is to be brought about. Accordingly in this case as well there is more time available for the desired relatively slow increase in pressure so that the loading of the parts in the system is lower. Furthermore, an initially steep drop in brake pressure makes it possible to attain a sufficiently prenounced drop in pressure during a certain period of time or, if desired, it is possible to increase the pulsation frequency.

Normally, only the first stage of the two-stage pump device is required and this stage — more especially again owing to regulation of the pulse amplitude in accordance with the braking pressure applied — makes possible a favorable adaptation to suit the braking conditions and prevailing road conditions. In addition to the advantage of an improved use of the coefficient of friction for force transmission, this makes possible a high efficiency, an economy in energy and the reduction in loading and vibration in the vehicle. A more pronounced decrease in braking pressure through a second stage only occurs when a very strong panic overbraking makes it necessary. However, even in this case it is then only possible to detect a weak vibration at the braking pedal on operation of the pump device.

A further improvement relates to a hydraulic circuit, which can be used in the case of other anti-locking systems as well. This circuit differs from known constructions with respect to features comprised in a claim. In the case of the circuit shown it is not necessary for a pump piston to assume a defined rest position, for example corresponding to the upper dead center position and to maintain this position in order to open a valve. A relatively large and powerful piston return spring necessary for the function of the known systems but otherwise undesired can be dispensed with in this case. This makes possible not only increased safety and the desired more rapid decrease in brake pressure drop but also a smaller construction of size and a saving in costs.

In addition to a compact manner of construction of the pump device and the arrangement of the anti-locking system on the master brake cylinder, it is to be regarded as advantageous that existing brake installations hardly need to be changed. By way of a summary it is possible to state that a substantial degree of safety can be achieved with little expense and it is possible to achieve a particularly favorable ratio of utility to costs. Further advantages are described in the description with reference to particular constructions.

BRIEF DESCRIPTION OF THE DRAWINGS

In what follows the invention will be described in more detail with reference to embodiments shown in the drawings.

DESCRIPTION OF THE PREFERRED EMBODIMENTS

Figures 1, 1A, 2:
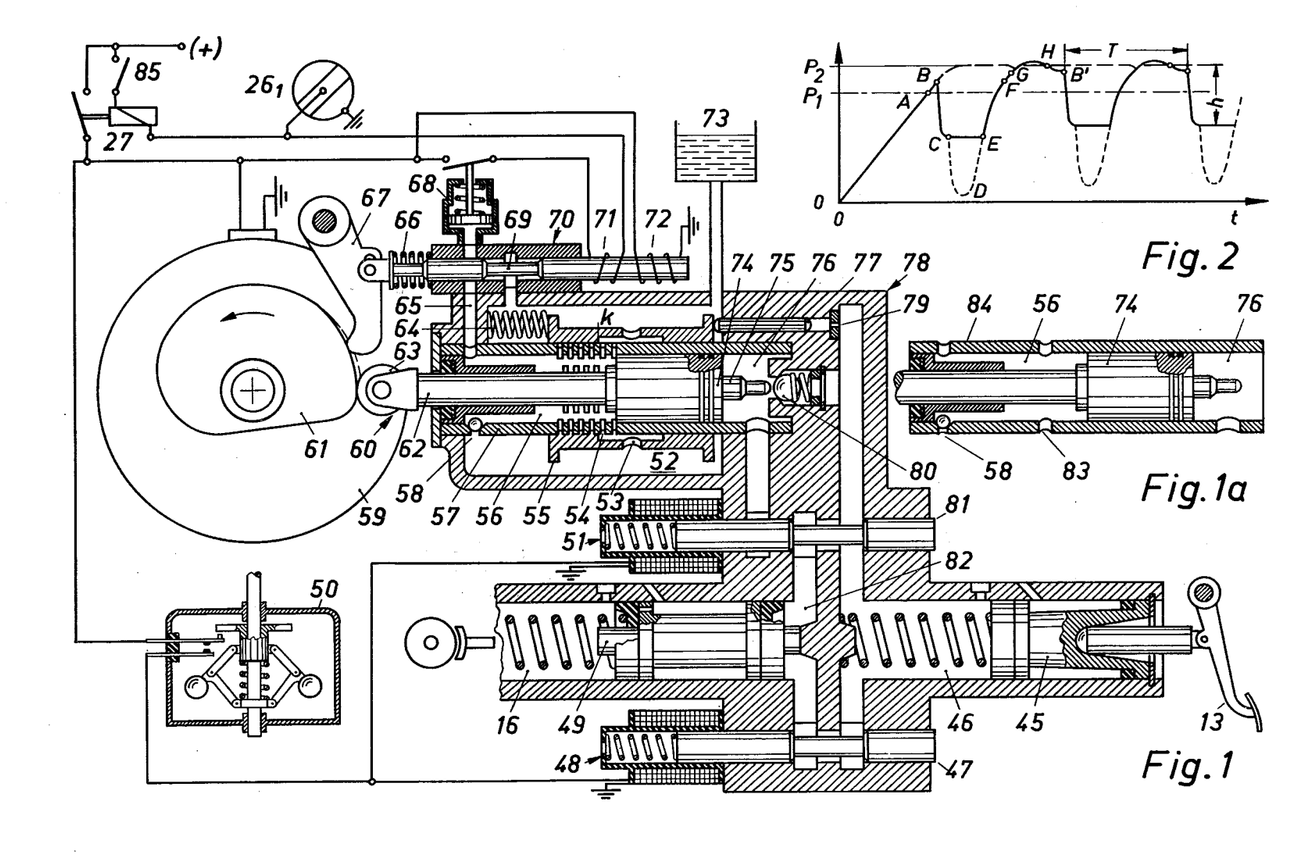
FIG. 1 is an overall view of an anti-locking system including the electrical control means.
FIG. 1a shows a two-stage pump cylinder bush with a piston.
FIG. 2 shows diagrammatically the course of brake pressure regulation $p = f(t)$.

FIG. 1 shows a regulatable piston pump 78 which in this case is connected hydraulically between a brake pedal 13 and a master brake cylinder 16 and is combined with the latter to form a single block. A chamber 46, on which a piston 45 actuated by a brake pedal 13 acts, is connected through a normally opened solenoid valve 51, which can be reversed, hydraulically with a chamber 82. This chamber 82 can have a direct or, as shown here, an indirect connection with the wheel brake cylinders, the connection being through a piston 49 in the master brake cylinder 16. A branch of the reversible solenoid valve 51 is connected with the first or working chamber 76 of a regulatable pump so that when the solenoid valve 51 is energized and its piston 81 is moved to the left, a hydraulic connection between the working chamber 76 and the chamber 82 exists. A second solenoid valve 48 with a piston 47 and which is normally opened and connects the chambers 46 and 82 with each other, is only intended to increase safety or reliability. It is not essential for understanding the principle of this arrangement. Both solenoid valves 51 and 48 are also connected electrically in parallel with each other and for the sake of reliability are connected via a centrifugally operated switch 50 with a slow release relay 27. The separately shown centrifugally operated switch 50 is normally mounted on the shaft of an electric motor 59, which drives the pump 60, or on the pump drive shaft in order that its contacts can only be closed when a brake pressure regulation is necessary and when the pump 60 is also in fact running. Between the chamber 46 and the working chamber 76 of the pump 60 there is a valve which can be controlled hydraulically and with a pin 75 of a piston rod 62, this valve being constructed, for example, as a ball non-return valve 80. A constant connection with the chamber 46 is also possessed by a piston 77, which acts on a control or regulating sleeve 55, which can be slid against the force of a spring 64 axially on a cylinder bush 57. Upstream from the piston 77, that is to say on the chamber 46 side, a throttle 79 is preferably provided in order to damp undesired pressure surges or variations at the piston 77. The sleeve part shown on the right of the control edge $k$ of the regulating sleeve 55 and provided with holes 53 is not essential for function and only serves for an improved axial guidance of the sleeve. The cylinder bush 57, which is divided by pump piston 74 arranged in a moving fashion in it into two chambers 76 and 56, has recesses 54 or holes 83 distributed on the periphery. These holes 83 are arranged adjacent to a chamber 56 and can be closed by the piston 74 from the inside and by means of the regulating sleeve 55 from the outside. The recesses 54, which are opened between the control edge $k$ of the regulating sleeve 55 and the left-hand edge of the piston 74, make possible a hydraulic connection for the chamber 56 to the chamber 52, with which a liquid supply container or reservoir 73 is connected. The working chamber 76 of the pump 60 remains hydraulically constantly separated, due to the piston seal, from the chamber 56 to the left of to the piston 74 and from the chamber 52. A cam 61 driven by an electric motor 59 serves to act via a follower roller 63 and via the piston rod 62 on the piston 74 connected fixedly with it in order to drive it in one direction and to release it in the other direction. It is convenient if furthermore a resilient follower plunger is guided in a hollow piston rod, for example, in order, independently of the position of the piston 74, to maintain constant contact with cam 61. The piston rod 62 is journalled and sealed in a conventional manner. The chamber 56 is constantly connected by means of a channel 65, with a hydraulic-electric pressure switch 68, which acting on pressure, in a manner similar to a braking light switch, by means of a contact can close an electrical current circuit. Between the chamber 56 and the chamber 52 a non-return valve 58 is so arranged that liquid can flow into the chamber 56. Parallel to this there is a valve as, for example, a solenoid valve 70, which is normally closed and serves to be opened when owing to a decrease in the braking pressure at the first stage, that is to say on closing the above-mentioned openings 54 or 83 on cylinder 57 or 84 an anti-locking action has not yet started. This solenoid valve 70 has two weak, oppositely acting windings 71 and 72, which can act magnetically on its armature or, respectively, on a spool valve 69. Furthermore, there is a mechanical connection from the piston 69 to the cam 61 via a cam lever 67 urged by a spring 66. This cam lever 67, which does not need to be connected fixedly with the piston 69 of the solenoid valve 70, has the purpose of making possible switching over of the piston 69 during certain periods of time or certain cam settings (at least from C to E in FIG. 2). If a switching over has been carried out by energization of the throw off winding 71, the cam 61 presses the piston 69 against the action of the spring 66 back into the starting position in order to urge it towards the holding magnet winding 72 again. This makes possible a favorable dimensioning of the solenoid valve 70 becuase only holding current has to flow and hardly any electrical energy has to be used up.

For electrical control of the anti-locking system use is made of the braking light switch 85 of the vehicle, a sensor $26_1$, slow release relay 27, valve 70, and a device for checking the anti-locking action and for actuating the valve. In this respect it is convenient to use a sensor $26_1$, which checks the rotary deceleration of a vehicle wheel and at the start of and during impermissible exceeding of a limit provides signals. A sensor $26_1$ which can for example be used for this purpose and its manner of operation is explained with reference to FIGS. 7 and 7a. The sensor $26_1$ is driven as is conventional, from a vehicle wheel or a drive shaft. It is connected electrically with the chassis and on the other hand is connected via the winding of the slow release relay 27 with the brake light switch 85. The purpose of the sensor $26_1$ is that of switching on via slow release relay 27 electric motor 59 and therefore a pump 60 when there is an excessive deceleration in wheel rotation. Furthermore, it decides whether a reduction in braking pressure is to occur below a first stage (C-E in FIG. 2) something which is only necessary in the case of very violent braking and therefore occurs relatively seldom. Electric motor 59, centrifugal switch 50 and the retaining magnet winding 72 of the above-mentioned magnetic or solenoid valve 70 are so connected with the switching contact of the slow release relay 27 as is shown in the circuit in FIG. 1. Between the same contact and the sensor $26_1$ the throw-off winding 71 of the solenoid valve 70 is arranged in series circuit with an hydraulic-electric pressure switch 68.

FIG. 1a shows a cylinder bush 84, which also makes possible a two-stage reduction in pressure in the manner proposed here and which can be used instead of the continuously regulatable cylinder bush 57 in FIG. 1. In this case the regulating device consisting of the piston 77, the regulating sleeve 55 and the spring 64 would be superfluous and the throttle 79 would have to be replaced by a closed disc. In the case of the use of this cylinder sleeve 84 the braking pressure can no longer be regulated within the first stage and instead it would assume the definite values corresponding to the desired release or unloading volume.

OPERATION

With reference to FIG. 2, which shows the diagrammatic course of braking pressure regulation in accordance with time, the manner of operation will be explained in more detail.

Reference to a power displacement or travel diagram for a braking system will show that on actuation of a brake pedal firstly various amounts of backlash in the system must be taken up and frictional resistance must be overcome before the braking pad comes into engagement and braking begins. From this point onwards — owing to the elastic characteristic of a brake duct system — a certain increase in braking pressure corresponds to a certain, corresponding liquid volume, which must be displaced from the master brake cylinder into the duct system. Conversely this also applies, taking into account hysteresis, in the case of a lowering in the braking pressure as well so that by suitable dimensioning of the release volume regulation of braking pressure can be carried out as is carried out in the present case, when there is a danger of locking of the wheels. The maximum displacement volume of the pump 60 is therefore dimensioned for the maximum relief or release volume required.

In the case of normal, low-slip braking the deceleration in wheel rotation and in movement of the vehicle bear a certain relationship to each other so that the sensor $26_1$ operating in accordance with the principle of the shifting response threshold does not provide any signal. The braking pressure exerted by the braking pedal 13 via the piston 45 in the chamber 46 is transmitted hydraulically through the opened solenoid valve 48; 51 to a piston 49 in the master cylinder 16 and normal braking action is not affected by this.

If, however, owing to excessively violent braking action excessive wheel slip (danger of wheel locking) occurs, the braking pressure $p_1$ at point A in FIG. 2 is therefore exceeded, driving or control current can flow from the braking light switch 85 via the slow release relay 27 and the sensor $26_1$. The slow release relay 27 responds immediately and its armature remains attracted as long as the sensor $26_1$ allows the flow of driving or control current, also in the form of pulses. Accordingly the electric motor 59 is switched on and while it is running the solenoid valves 48 and 51 or at least one of them receive current via the centrifugal switch 50. The valves or their pistons or spool valves 47 and 81 are therefore conveniently designed, in order to increase reliability, so as to be only capable of being switched over when the electric motor 59 is actually running or the pump is in operation. For switching over these valve pistons or spool valves 47 and 81 accordingly a centrifugal coupling or the pump pressure produced can be used.

While now the solenoid valves 51 and 48 are switched over or, respectively, closed so that the braking pressure applied by the driver is shut off from the chamber 82, the cam 61 has turned in the direction of the arrow and suddenly released the piston 74 so that it can move. The reduction in brake pressure now occurs, as intended in the present case, extraordinarily quickly, because the piston or plunger 74 on moving back is independent from the cam 61, does not find any substantial resistance and liquid is propelled by it out of the chamber 56 without through the recesses 54 (and holes 53) into the chamber 52 and, respectively, into the supply container 73 (see pressure drop from B to C in FIG. 2). The regulating sleeve 55, which is balanced with respect to pressure, and which can be slid against the action of a spring 64 via throttle 79 and piston 77, for example, in accordance with the brake actuating force exerted by the driver, determines by means of its control edge $k$ the stroke of the piston 74 and therefore the release or relief volume in the working chamber 76. Accordingly the quantity of liquid escaping from the wheel brake cylinders is specifically determined or metered and with it the reduced braking pressure. Shortly before the left-hand edge of the piston 74 reaches the control edge $k$ of the regulating sleeve 55, it damps its movement itself owing to throttling of the flow-out cross-section (see curvature at C in FIG. 2). As a result a pressure is produced in the chamber 56, which closes the pressure switch 68 and prevents further movement of the piston 74, when the recesses 54 are completely closed. Since a holding or retaining current flows through the winding 72 of the solenoid valve 70, the cam lever 67 and, respectively, the piston 69 cannot follow the receding cam track and cannot produce any switching over. The check or non-return valve 58 is also closed. The braking pressure now remains constant (from C to E in FIG. 2), because the danger of wheel locking will normally have been coped with and acceleration of the wheels will have started again in the meantime. The rotating cam then actuates the piston 74 again via the plunger roller 63 and the piston rod 62 only at E in FIG. 2 in order to move back the relief volume from the working chamber 76 into the wheel brake cylinder.

If, however, owing to a very violent panic braking at C in FIG. 2 the tendency for wheel locking should still exist or if the acceleration in wheel rotation should not occur, it is possible — and this constitutes a substantial advantage — a further drop in pressure can immediately occur. Much the same applies for cases in which in the time interval from C to E a renewed drop in pressure is necessary. If now, for example, at point C the danger of wheel locking should still exist, current can flow through the sensor $26_1$, the closed pressure switch 68 and the throw-off winding operating to produce an opposite effect to that of the holding or retaining magnet winding 72. The magnetic field of the winding 72 is weakened owing to the counter-energization, the armature and, respectively, the piston 69 are released so that the spring 66 moves it to the left and the pressure in the chamber 56 decreases further owing to the open position of the solenoid valve 70 (C–D in FIG. 2). The sensor $26_1$ decides again in each cycle or period T whether the braking pressure can remain constant from C to E or whether it is necessary to pass through a part of the curve from C via D to E and a correspondingly deeper or more pronounced decrease in braking pressure is to be produced. The frequency of the pulsation is in any case so large that the vehicle wheels only run for a short time into the excessive braking zone (above $P_1$) in order not to loose excessive energy of rotation in it.

As soon as the rotating cam 61 has engaged the piston 74 again in order to force back the release liquid from the working chamber 76 into the brake duct system, liquid flows on into the chamber 56 via an open check or non-return valve 58 and the recesses 54, which have been opened again. At the same time the piston 69 of the solenoid valve 70 is pushed back by the cam lever 67 and offered to the holding or retaining magnet winding 72. At F (FIG. 2) for example the initial pressure has been reached again and at G with the pin 75 the check valve 80 is opened again. The result is a compensation or balancing of pressure which can be felt to a slight degree at the braking pedal, with respect to the braking pressure $p_2$ as exerted by the driver. At H behind the receding piston 74 the non-return valve 80 closes again and the next period or cycle T can begin.

The pulsations are repeated until the sensor $26_1$ indicates parity between the deceleration in wheel rotation and linear vehicle movement by switching off the slow release relay 27 and accordingly as a result the electric motor 59. The spool valves 47 and 81 of the solenoid valves 48 and 51 return owing to spring force back into their resting positions and the braking can be continued in the conventional manner. From a functional point of view it is not necessary in this respect — and instead it would only be convenient — if the cam 61 and, respectively, the pump piston 74 were to assume a certain rest position, for in the case of this hydraulic circuit a check valve 80 does not need to be opened by a piston 74 or a pin 75. The electrical operation is explained in more detail in the case of the manner of operation of the sensor $26_1$ with reference to FIGS. 7 and 7a.

The pump 60 in accordance with the invention, which is very simple and easy to set, can also be regulated just as well in dependence with any other technical or physical magnitudes. The setting of the regulating sleeve 55 could be carried out in accordance with electrical measured values magnetically for example. In order to achieve a desired function or characteristic of regulation instead of one spring 64 with a linear characteristic it would be possible to use a spring with a progressive or degressive characteristic or any suitable spring circuit. This means, for example, that the magnitude $h$ in FIG. 2 does not have to be proportional to the braking pressure and that any desired function $h = f(p_2)$ can be achieved. (The magnitude $h$ defines the brake pressure release, $p_2$ denotes the braking pressure exerted by the driver.)

Figure 3:
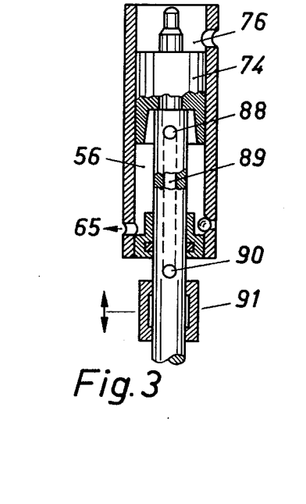
FIG. 3 shows a (two-stage) pump cylinder bush with a piston and a sleeve slide which can be moved on its piston rod.

FIG. 3 shows an embodiment for regulating the release or relief stroke in the case of which the holes 88 and 90 are connected by a piston rod 89 which for at least a part of it is hollow.

In accordance with the setting of an axially displaceable and regulatable sleeve slide 91 (or a rotary slide 91a as in FIG. 5) it is possible for a precisely metered out quantity of liquid to escape from chamber 56 through the holes 88 and 90 until the hole 90 is closed by the sleeve slide 91. Accordingly also the release or relief liquid quantity flowing into the working chamber 76 is precisely defined, and the reduced braking pressure depends on it.

Figure 4:
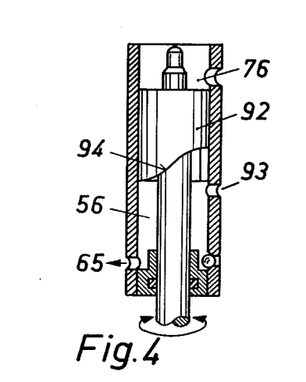
FIG. 4 shows a (two-stage) pump cylinder bush with a piston which can be adjusted by turning for oblique edge control.

FIG. 4 shows an embodiment of a pump piston 92 in the case of which the stroke can be varied by rotation. In this respect it is a question of an oblique edge control means. This piston 92 as well is displaced by liquid entering into a working chamber 76, for example, to such an extent that the control edge 94 closes a hole 93. Before the piston 92 reaches this position, it damps its movement itself by the escape cross-section which becomes less and less. The metered out quantity of liquid which has flowed into the working chamber 76 is forced back on a compression or force stroke of the pump piston 92 again.

Figure 5:
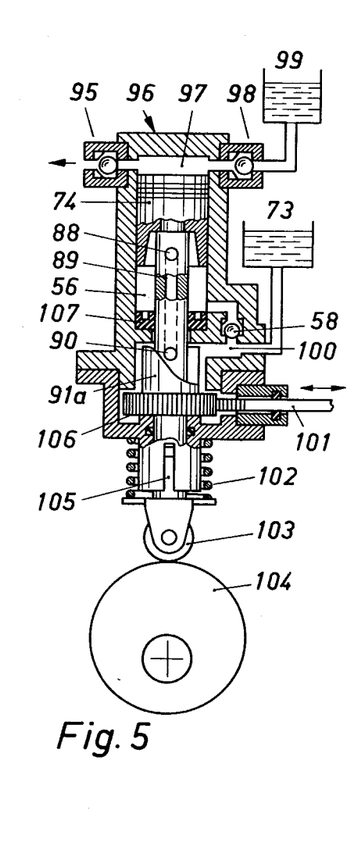
FIG. 5 shows a pump device with a sleeve slide which can be adjusted by turning.

FIG. 5 shows a further regulatable pumping device for general purposes. It possesses a cylinder in which a piston 74 can move in a sealed manner. The piston divides the cylinder into an upper and a lower chamber. The upper or first chamber 97, which serves as a working chamber, has, for example, one inlet valve 98, which is connected with a liquid container 99 and an outlet valve 95, through which the metered out quantity of liquid is moved out. The lower or second chamber 56 contains liquid for stroke regulation. Between a chamber 100, which is connected with a liquid supply container or reservoir 73, and the chamber 56 a check valve 58 is incorporated in order to allow access of liquid into the chamber 56. The two chambers 56 and 100 are separated from each other by means of a seal 107. A piston rod 89 connected with the piston 74 is held from twisting by guiding slots 105. It is pressed downwards by a spring 102. As a driving means a rotating eccentric 104 is provided which raises the piston 74 by means of a plunger roller 103 and the piston rod 89 and then releases them for the purpose of stroke regulation. In the piston rod 89, which is at least partly hollow, radial holes 88 and 90 are provided, which make possible a liquid connection between the two chambers 56 and 100. A hole 88 remains always within the chamber 56 and the other hole 90 always remains in the chamber 100. On the piston rod 89 a sleeve slide 91a is arranged, which, for example, has an oblique edge and can be actuated by means of a rack 101 and a rack pinion 106 in order to close the hole 90. The setting device 91a, 101 and 106 therefore serves to interrupt the above-mentioned liquid connection 88, 89 and 90 in order in this manner to limit the stroke of piston 74.

In this case in principle the manner of operation is as already described. The piston 74 is, for example, moved by the force of the liquid column pressing on it or by a spring 102 downwards to such an extent that the sleeve slide 91a closes the hole 90 with a throttling or choking action in order to dampen the piston movement and finally to limit the stroke. The correspondingly metered-out quantity of liquid, which has flowed into the working chamber 97 through the inlet valve 98 is pumped out on the pressing stroke of the piston 74 through the outlet valve 95 which may be biased with a spring if desired. During this pressing stroke liquid again flows through the check or non-return valve 58 and through the hollow piston rod 89 into the chamber 56.

The sleeve slide 91a which is compensated with respect to pressure and can be readily and continuously adjusted can be replaced without any trouble and by suitably selecting its curved track there is the possibility of highly satisfactory adaptation to any desired course of functioning. The sleeve slide 91a could just as well be incorporated in the upper chamber 56. A toothed rack 101 must, however, in this case then be sealed to resist the pressure occurring in this case when it is moved outwards, something which would not be necessary in the case of magnetic actuation of the sleeve slide 91a.

Figure 6:
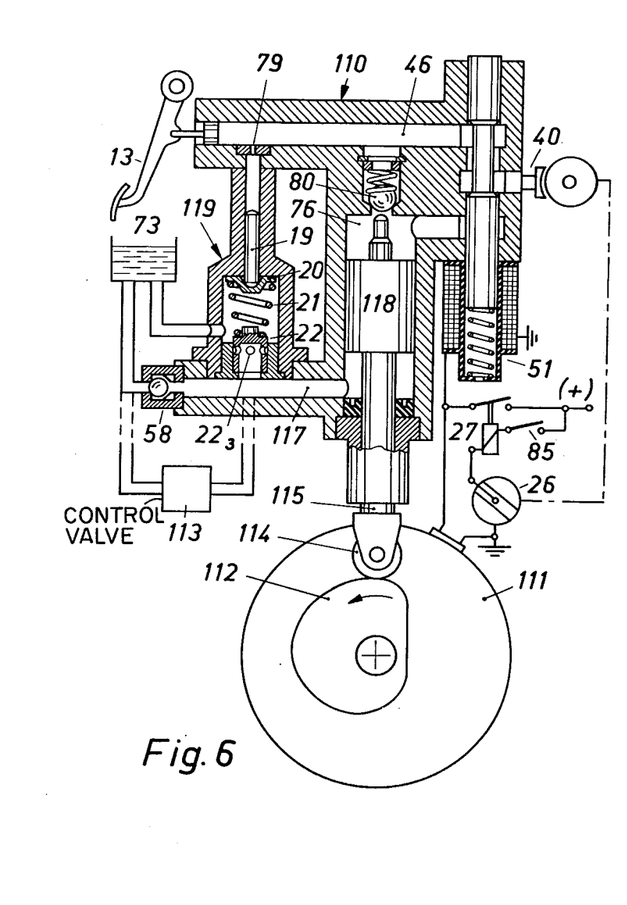
FIG. 6 shows an anti-locking system operating with a pressure regulating valve.

FIG. 6 shows an antilocking system with a particularly simply constructed regulatable pump 110. This pump operates according to a similar process or method discussed here of lowering pressure with a pressure regulating valve 119 in accordance with the invention.

CONSTRUCTION

The hydraulic circuit and arrangement of a pump device with a working chamber 76, a non-return valve 80, a duct 46, a three-way valve 51, and a braking cylinder 40 corresponds to the construction shown in FIG. 1. A braking pedal 13, which is provided with a piston, acts on a hydraulic line or duct 46. This duct 46 is normally connected by a three-way valve 51 (for example a solenoid operated valve) with the brake cylinder 40. On a third branch of the three-way valve 51 the working chamber 76 of the pump device is connected so that in the case of need the braking cylinder 40 is separated from the duct 46 and is connected with the working chamber 76. Between the working chamber 76 and the duct 46 there is a check valve 80, which can be actuated hydraulically and mechanically by a piston 118 in order to make possible pressure equalisation or compensation in a positive manner. On the lower end side of the piston 118 there is a chamber 117, which contains liquid for stroke regulation. Between this chamber 117 and a supply chamber or reservoir 73 there is a non-return valve 58 in order to allow the passage of liquid into the chamber 117. A regulatable valve 119, which can be constructed in any suitable manner, is also arranged between the chamber 117 and the supply container 73 in order to change the pressure in the chamber 117 as may be required. A pressure regulating valve 119 which is used, for example, consists of a moving piston 19, which is acted upon by the exerted braking pressure from the duct 46 and which via sleeve 20 and spring 21 acts on the valve 22. The cross-section of the piston 19 is smaller than that of the valve 22 on the chamber 117. Furthermore, this cross-section ratio is so selected that in the case of most relatively weak excess braking actions occurring a sufficiently pronounced braking pressure drop occurs. This valve 22, which can be constructed in any suitable manner, is in this case, as is shown in the drawing, in the form of a piston with radial holes $22_3$. It can be displaced axially and is exposed from below to the liquid pressure in the chamber 117 so that it can be opened against the force of a spring 21. Between the duct 46 and the piston 19 there is a throttle opening 70 which has the purpose of damping pressure peaks of short duration. In the case of the specific embodiments shown here, more particularly in FIG. 1, a throttling action is however hardly necessary.

A piston rod 115 connected with the piston 118 is mounted in a conventional manner and provided with sealing means. It extends out of the cylinder. The piston 118 is driven upwards, for example, by means of electric motor 111, cam 112, and plunger roller 114 attached to the piston rod 115. In the other direction the piston 118 is free so that it displaces liquid out of the chamber 117 until the two forces have the same magnitude, which act against each other on the two end surfaces of the piston 118 and accordingly limit its stroke.

A switching valve 113 shown in the figure, which is arranged in parallel to the pressure regulating valve 119 and is normally closed, serves to bridge over the pressure regulating valve 119 hydraulically when this should be necessary in special cases (for example in the case of a very violent panic excess braking action).

Figure 7A:
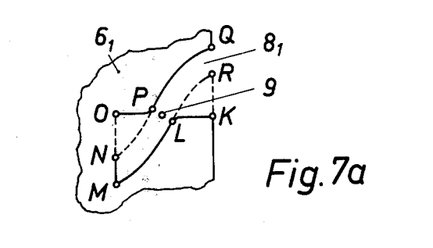
FIG. 7a is a view of part of a sensor looking in the direction A of FIG. 7.

In the electrical circuit use is made, for example, of a sensor 26, whose mass can, for example, have the original curve tracks shown in FIG. 7a, NPQ and MLR, and which via a braking light switch 85 and a slow release relay 27 or a suitable semi-conductor circuit, controls the electric motor 111 and the solenoid valve 51. This latter valve 51 can be actuated for the sake of reliability, for example, as is also the case with FIG. 1, by a centrifugal switch 50 closed when the engine is running.

MANNER OF OPERATION

As can be seen in FIG. 6 the hydraulic pressure produced via the brake pedal 13 in the duct or line 46 is transmitted via the opened solenoid valve 51 to the brake cylinder 40 and the normal braking action remains unaffected. On the other hand, on the occurrence and during the duration of excessive wheel brake slip the electric motor 111 and therefore simultaneously the solenoid valve 51 are switched on by means of the sensor 26. Accordingly the pump piston 118 released by the rotating cam 112 can move back under the action of the pressure of the braking liquid and can displace liquid from the chamber 117 to the opened valve 22 into the supply chamber 73 until an equilibrium condition has been achieved between the forces, which are exerted on the valve 22 by the release pressure on the one hand and the braking pressures applied by the driver on the other hand. When following this the rotating cam 112 engages the piston 118 with the plunger roller 114 in order to increase the braking pressure, liquid can flow via the check valve 58 from the supply chamber 73 into the chamber 117 located under the piston 118 to provide a follow-up action. At the end of the pressing stroke the opening of the check valve 80 for a short time brings about an equilisation with the braking pressure exerted by the driver. This compensation action is also detectable, just as in FIG. 1, by a slight vibration of the brake pedal 13.

The pulsations are repeated in this case as well until the sensor 26 again detects parity between the wheel rotation and vehicle linear deceleration and accordingly switches off the electric motor 111 and the solenoid valve 51. Although the anti-locking system shown in FIG. 6 and its pump device 110 respectively are particularly suitable for highly skilled or sport drivers, who as a matter of experience do not over-brake or brake panically, in this case as well the braking pressure can be decreased to a greater extent if necessary than is permitted by the pressure regulating valve 119. This can be achieved when the check valve 58 is opened, for example, mechanically or is short-circuited by a control valve 113 shown in the figure and connected in parallel with the check valve 58 hydraulically. The control command for this can be provided, for example, by particularly pronounced sensor rotary beats, which indicate the violent over-braking action. Using a sensor $26_3$ (as mentioned in the above U.S. patent application), whose feeler is provided with strain gauge strips, it would be possible for example to measure the magnitude of the beats by bending and a corresponding change in the resistance.

The pressure regulating valve 119, which determines the amplitude of the pulsation in dependence on the braking pressure applied, can preferably be constructed for optimising the operation of the system. It does not need to have any proportional characteristic or behavior; instead it can, more particularly by suitable choice of the valve construction 22 and by selection of the characteristic of the spring 21, have any desired characteristic. Furthermore, instead of this pressure regulating valve 119 it would be possible to incorporate a conventional regulatable valve or for example a pressure limiting valve. Thus, also with this pump device 110 an inappropriately pronounced drop in the braking pressure can be avoided. By the amplitude regulated in accordance with the particular specific conditions, of pulsation, the braking and steering of a vehicle in the most optimum wheel slip range is possible. This involves obtaining the numerous other advantages already mentioned above.

FIG. 7 shows a sensor $26_1$, which serves in FIG. 1 for control and which in this respect fulfills several tasks. This sensor $26_1$ carries out comparison measurements between the wheel rotation and the linear vehicle deceleration and in the case of an excessive difference in deceleration provides electrical measurement signals. In this case it has the task of switching on a regulatable pump device with a slow release relay 27 then and only as long as this is necessary. A second task fulfilled by the sensor $26_1$ is that of checking the anti-locking action after the drop in braking pressure to a first stage in order if required to produce a more pronounced drop in pressure. The last-mentioned aim is attained in a very simple manner by a certain shape of its curved track or by unilateral insulation of a feeler. The checking function can be explained in an easily comprehensible manner with reference to sensor $26_1$, which comprises a contact feeler 9 and for example a curve track $8_1$ in accordance with FIG. 7a, this particular sensor being referred to other sensors which are also suitable for this purpose.

CONSTRUCTION OF THE SENSOR

A shaft 3 with a belt pulley $1_1$ attached to it is journalled by means of two ball bearings in the housing of the sensor $26_1$. On the shaft 3 or on a bush $3_1$ fixed to it there are two discs 4 attached to it in a fixed manner. On these discs 4 and on a mass 6 there are for example two springs 5 which are prestressed as regards rotation and pressure. Accordingly the spring anchored mass 6 which is provided with a bearing bush, can move in relation to the bush $3_1$ in the rotary direction and also axially under the influence of inertial forces on the bush $3_1$. A feeler 9 which checks or monitors the mass movement, for instance a contact feeler, has a mechanical and electrical connection with a slip ring 11 attached to the shaft 3 and insulated from it. The bushes 12 serve for supplying current and removing it. An electrically conducting ring $6_1$ provided with a curve track $8_1$ or a ring segment is connected with the mass 6 in a fixed manner. A view of this ring $6_1$ from the direction A looking towards its curve track $8_1$ is shown in FIG. 7a.

The sensor is incorporated with its longitudinal axis parallel to the longitudinal axis of the vehicle. It is driven in a conventional manner from a vehicle wheel or by means of belts from the drive shaft of the vehicle.

The manner of operation is now explained with reference to FIG. 7, FIG. 1 and FIG. 2.

The arrows shown in FIG. 7 indicate the direction of rotation $v_r$ of the sensor $26_1$ in the case of forward vehicle travel $v_t$. In the case of normal low slip braking or also acceleration the mass 6 subjected to rotary and linear inertial forces, with its ring $6_1$ moves in relation to the feeler 9 so that the feeler does not contact the curve tracks NPQ or MLR (FIG. 7a). Normal braking is not influenced by this. However, if owing to excessively violent braking there is a tendency for the wheels to lock so that the definite ratio of the wheel rotation to the vehicle linear deceleration is improperly departed from, the feeler 9 makes contact with the track P-Q. Now current can flow through the sensor $26_1$ and the brake pressure reduction can be carried out for example with the switched-on pump device 78 as shown in FIG. 1. The pressure drops steeply from B towards C (see FIG. 2) and generally ensures that in the meantime the wheel speed of rotation, which has dropped in the meantime to an excessive amount owing to the danger of wheel locking, increases again. Accordingly the feeler 9 departs from the track P-Q. It could now touch the oppositely placed track L-R, which here however is either insulated from the feeler 9 or is set back in the form of the track L-K. Therefore, normally in the time of C to E (FIG. 2) no current flows through the sensor $26_1$ but current does flow to the electric motor 59 and the holding magnet winding 72, because the slow release relay 27 does not switch off in the case of short currentless intervals. The braking pressure now remains from C onwards (FIG. 2) practically constant until at E the cam 61 (FIG. 1) again engages the piston 74 in order then to increase the pressure to the value $p_2$ exerted by the driver. Then the same operation can be repeated when there is again a tendency for the wheels to lock and the slow release relay 27 therefore does not switch off the pump device 78.

If however owing to very violent excessive braking at C in FIG. 2 the tendency to lock should still exist or, respectively, the acceleration of wheel rotation should not occur, the feeler 9 still has contact with the track P-Q (FIG. 7a). Therefore, immediately via the closed pressure switch 68, and via the throw-off winding 71 current can flow and a further pressure drop can occur in the manner already described.

The frequency of the pulsation or the cycle duration T (FIG. 2) is so selected that the vehicle wheels only come for a short time below and above the blocking pressure $p_1$ in order alternately in the zone above $p_1$ to release only a little rotary energy and to slow down in speed and then underneath $p_1$ to increase again. As a result the wheels can therefore rotate on the ground almost in the optimum brake slip range.

The tracks located in FIG. 7a to the left of the feeler 9 apply accordingly for the braking in the case of backward travel.

As can be seen the sensor $26_1$ can also measure wheel slip in the case of acceleration of a vehicle and indicate this slip. In the case of excessive forward rotary acceleration the feeler 9 contacts the track M-L and in the case of excessive backward rotary or angular acceleration there is contact with the track P-Q.

Such a sensor is particularly suitable for controlling anti-locking systems because owing to the deceleration comparison measurement carried out it takes into account the consistency or surface properties of the road and accordingly prevents wheel locking in a more reliable manner. It can measure relatively exactly and in a sensitive manner and its measuring system can be constructed with a higher natural frequency. Furthermore, it is simple and robust. It can also be constructed so as to be particularly small in size and to be low in costs.

Apart from the above-described porposals in accordance with the invention as shown, in the case of which for example a regulatable pump 78 acts on all vehicle wheels, there is also the possibility of providing individual wheels, wheel groups or axles — for example in the case of multi-axle vehicles — with separate pumps or anti-locking systems of this type and thus to provide protection against locking.

I wish it to be understood that I do not desire to be limited to the exact details of construction shown and described, for obvious modifications will occur to a person skilled in the art.

What I claim is:

1. A regulatable pump device in combination with an antilocking system for a vehicle, comprising: at least a wheel, a sensing means for controlling the ratio of wheel periphery deceleration to vehicle deceleration, a braking system having: a brake pedal, a master cylinder, a master brake pressure piston therein connected with said brake pedal, at least a wheel brake cylinder is connection with said master cylinder, a brake light switch for said braking system, a relay means connected to said pump device and in series with said brake light switch and said sensing means for actuating said pump device, said pump device having:

a cylinder, a piston being moveable and sealed therein and dividing the cylinder into two separate chambers: a first chamber on one end of the cylinder serving as working chamber and a second chamber on the other end of the cylinder serving for stroke regulation, a three-way valve connected with said relay means and in communication with said wheel brake cylinder, the master cylinder and said working chamber of the pump cylinder in order to normally connect said wheel brake cylinder with the master cylinder and, when activated, to connect the wheel brake cylinder with the working chamber; said pump device further comprising:

a reservoir chamber, at least one opening between the second chamber and the reservoir chamber and which is closeable by means of said pump piston, a driving cam in order to drive the pump piston in one direction and to release the piston in the other direction, a drive means for said driving cam, a check valve incorporated between said reservoir chamber and said second chamber of the pump cylinder in order to admit fluid into the second chamber, a hydraulic-electric pressure switch, which is hydraulically connected to said second chamber, a solenoid valve, which is arranged hydraulically in parallel to said check valve and which normally closes this connection, having: a spool valve and a spring, which presses said spool valve against said cam, a holding magnet winding in connection with said relay means in order, when active, to hold the spool valve against the force of said spring, and a throw-off winding, which is electrically connected in series with said relay means, the pressure switch, and the sensing means in order, when active, to weaken the effect of said holding magnet winding, whereby said solenoid valve can open and the brake pressure decrease further.

2. A regulatable pump device in combination with an antilocking system for a vehicle, comprising: at least a wheel, a sensing means for controlling the ratio of wheel periphery deceleration to vehicle deceleration, a braking system having: a brake pedal, a master cylinder, a master brake pressure piston therein connected with said brake pedal, at least a wheel brake cylinder in connection with said master cylinder, a brake light switch for said braking system, a relay means connected to said pump device and in series with said brake light switch and said sensing means for actuating said pump device, said pump device having:
- a cylinder, a piston being moveable and sealed therein and dividing the cylinder into two separate chambers: a first chamber on one end of the cylinder serving as working chamber and a second chamber on the other end of the cylinder serving for stroke regulation,
- a three-way valve connected with said relay means and in communication with said wheel brake cylinder, the master cylinder and said working chamber of the pump cylinder in order to normally connect said wheel brake cylinder with the master cylinder and, when activated, to connect the wheel brake cylinder with the working chamber; said pump device further comprising:
- a reservoir chamber, at least one opening between the second chamber and the reservoir chamber and which is closeable by means of said pump piston, a driving cam in order to drive the pump piston in one direction and to release the piston in the other direction, a drive means for said driving cam,
- a check valve incorporated between said reservoir chamber and said second chamber of the pump cylinder in order to admit fluid into the second chamber, a hydraulic-electric pressure switch, which is hydraulically connected to said second chamber, and a valve means, which is arranged hydraulically in parallel to said check valve and which normally closes this connection, having at least one winding, which is electrically connected in series with said relay means, the pressure switch, and the sensing means in order, when active, to open said valve means, whereby the pressure in said second chamber and the brake pressure can further decrease.

3. A regulatable pump device in combination with an antilocking system for a vehicle, comprising: at least a wheel, a sensing means connected to said pump device for controlling the wheel rotary movement of the vehicle and for actuating said pump device when the wheel periphery deceleration differs inadmissably from the vehicle deceleration, a braking system having: a brake pedal, a master cylinder, a master brake pressure piston therein, connected with said brake pedal, at least a wheel brake cylinder in connection with said master cylinder, said pump device having:
- a cylinder, a piston being moveable and sealed therein and dividing the cylinder into two separate chambers: a first chamber on one end of the cylinder serving as working chamber and a second chamber on the other end of the cylinder serving for stroke regulation,
- a three-way valve connected with said sensing means and in communication with said wheel brake cylinder, the master cylinder and said working chamber of the pump cylinder in order to normally connect said wheel brake cylinder with the master cylinder and, when activated, to connect the wheel brake cylinder with the working chamber; said pump device further comprising:
- a reservoir chamber, at least one opening between the second chamber and the reservoir chamber, an adjustable valve means on said opening, a check valve, which is incorporated between said reservoir chamber and said second chamber of the pump cylinder in order to admit fluid into the second chamber, at least one control valve arranged hydraulically in parallel to said check valve and operatively connected to said sensing means, a control means for said control valve and a drive means for actuating said pump device.

4. The regulatable pump device defined in claim 3, wherein said control valve includes a solenoid valve having a spool valve and two windings, a first holding magnet winding for retaining said spool valve in its position, and a second winding which, when active, produces an opposite effect to the first winding for releasing said spool valve, and
wherein said control means for said control valve includes: a hydraulic-electric pressure switch, hydraulically in communication with said second chamber of the pump and electrically connected in series with said second winding and said sensing means.

5. The regulatable pump device defined in claim 3, wherein said cylinder of the pump is a cylinder bush having recesses distributed on the periphery and arranged adjacently, through which said second chamber communicates with said reservoir chamber and
wherein said adjustable valve means includes a regulating sleeve slidably mounted on said cylinder bush above said recesses so that the recesses can be closed from the outside by said regulating sleeve and from the inside by means of said pump piston.

6. The regulatable pump device defined in claim 5, having: a cylinder bore in said pump device communicating with said master cylinder, a piston, which is moveable in said cylinder bore, the said regulating sleeve, which is connected with said piston, and a spring against which said regulating sleeve is slidable by means of said piston.

7. The regulatable pump device defined in claim 3, wherein said pump piston is rotatably mounted and has an oblique edge, which communicates with said opening between said second chamber and the reservoir chamber.

8. A regulatable pump device comprising: a cylinder, a reciprocating piston therein dividing said cylinder into a first chamber on one end of the cylinder and a second chamber on the other end of the cylinder, so that both chambers are separated from one another and sealed, a piston rod, which is fastened on said piston and is partially hollow, is sealed and projects out of the second chamber, a reservoir chamber, a check valve between the reservoir chamber and said second chamber in order to allow fluid to pass into the second chamber, radial holes in the hollow piston rod, through which said second chamber is in communication with the reservoir chamber, a sleeve slide on said piston rod for selectively closing one of the said radial holes in the hollow piston rod, a regulating means for said sleeve slide and a drive means for said piston in order to drive the piston in at least one direction, whereby the piston displaces fluid out of the second chamber until said sleeve slide closes at least one hole in the piston rod.

9. A regulatable pump device in combination with an antilocking system for a vehicle, comprising: at least a wheel, a sensing means operatively connected to said wheel for controlling the ratio of wheel periphery deceleration to vehicle decleration, a braking system having: a brake pedal, a master cylinder, a master brake pressure piston therein connected with said brake pedal, at least a wheel brake cylinder in connection with said master cylinder, a brake light switch for said braking system, a relay means connected to said pump device and in series with said brake light switch and said sensing means for actuating said pump device, said pump device having:

- a cylinder, a piston being moveable and sealed therein and dividing the cylinder into tow separate chambers: a first chamber on one end of the cylinder serving as working chamber and a second chamber on the other end of the cylinder serving for stroke regulation,
- a three-way valve connected with said relay means and in communication with said wheel brake cylinder, the master cylinder and said working chamber of the pump cylinder in order to normally connect said wheel brake cylinder with the master cylinder and, when activated, to connect the wheel brake cylinder with the working chamber; said pump device further comprising:
- a reservoir chamber, a first check valve, which is incorporated between said reservoir chamber and said second chamber of the pump cylinder in order to admit fluid into the second chamber,
- a second check valve incorporated between said master cylinder and the first pump chamber in order to permit the passage of fluid out of said first chamber,
- a pressure regulating valve is mounted between said second pump chamber and the reservoir chamber and is in communication with said master cylinder in order to control the pressure in the second chamber, and a drive means for said pump piston in order to drive same in one direction.

10. The pump device defined in claim 9, wherein said pressure regulating valve having a chamber in communication with said master cylinder, a piston, slidably mounted in said chamber, a valve element in communication with said second chamber of the pump, means for connecting said piston with said valve element and an outlet opening which communicates with said reservoir.

11. The pump device defined in claim 10, wherein a throttle opening is arranged between the master cylinder and said piston in the chamber of said regulating valve, and wherein a spring connects said piston and said valve element with each other.

12. A pump device in combination with an antilocking system for vehicles, comprising: a hydraulic braking system having a brake pedal, a master cylinder, a master brake pressure piston therein connected with said brake pedal, a brake line system in communication with said master cylinder, at least a wheel, having a wheel brake cylinder in connection with the brake line system, a sensing means for controlling the wheel rotary movement of the vehicle, a three-way valve connected to said sensing means and arranged between said master cylinder and said wheel brake cylinder in order, when inactive, to communicate these cylinders with each other; said pump device includes a cylinder, a piston therein and a working chamber, which is connected with said three-way valve so that said valve, when active, communicates the working chamber with the wheel brake cylinder, a check valve, which is incorporated between said working chamber and said master cylinder in order that fluid can pass to the master cylinder, a pin arranged on said pump piston for the positive opening of said check valve, and a drive means for said pump piston operatively connected to said sensing means.

13. A regulatable pump device comprising: a cylinder, a reciprocating pump piston therein dividing said cylinder into a first chamber on one end of the cylinder and a second chamber on the other end of the cylinder, so that both chambers are separated from one another and sealed, a piston rod attached to said pump piston, a reservoir chamber, a check valve between the reservoir chamber and said second chamber in order to allow fluid to pass into the second chamber, at least one opening between said second chamber and the reservoir chamber, a valve means for said opening combined with the pump piston, said piston having an oblique edge and is rotatably mounted in said cylinder, so that the oblique edge is selectively in communication with said opening in the second chamber, an adjustable means connected with the pump piston for turning said piston, so that said opening is closeable by the adjustable means and the piston; and further comprising a drive means for actuating the piston of said pump device.

* * * * *